United States Patent [19]
Kojima et al.

[11] Patent Number: 5,142,210
[45] Date of Patent: Aug. 25, 1992

[54] ABNORMAL STATE DETECTING APPARATUS OF A MACHINE TOOL

[75] Inventors: Takayoshi Kojima; Satoshi Eguchi; Takayasu Asano, all of Niwa, Japan

[73] Assignee: Okuma Machinery Works Ltd., Nagoya, Japan

[21] Appl. No.: 638,174

[22] Filed: Jan. 4, 1991

[30] Foreign Application Priority Data

Jan. 17, 1990 [JP] Japan .................... 2-7688

[51] Int. Cl.⁵ ............................. G05B 9/02
[52] U.S. Cl. ........................... 318/566; 318/563; 318/571; 318/475; 318/275; 364/474.12
[58] Field of Search ............ 318/566, 563, 572, 475, 318/275; 364/474.12; 82/132, 141; 409/134

[56] References Cited

U.S. PATENT DOCUMENTS

| | | | |
|---|---|---|---|
| 3,728,595 | 4/1973 | Adams | 318/571 |
| 3,733,940 | 5/1973 | Harman et al. | 82/132 |
| 4,267,914 | 5/1981 | Saar | 318/275 X |
| 4,617,635 | 10/1986 | Shimizu | 364/474.12 |

Primary Examiner—William M. Shoop, Jr.
Assistant Examiner—Saul M. Bergmann
Attorney, Agent, or Firm—Spensley Horn Jubas & Lubitz

[57] ABSTRACT

An abnormal state detecting apparatus of a machine tool having a servomotor. The apparatus is provided with a device for detecting an abnormal acceleration and an abnormal torque of the servomotor and a device for detecting an abnormal operation state of the servomotor from the directions of the detected acceleration and torque. When the torque, acceleration and operation state are all abnormal, the machine tool is judged to be in an abnormal state and the servomotor is controlled, thereby protecting the machine tool from an impact in an abnormal operation state.

12 Claims, 5 Drawing Sheets

ABNORMAL STATE DETECTING APPARATUS OF A MACHINE TOOL

BACKGROUND OF THE INVENTION

1. Field of the Invention

The present invention relates to an apparatus for detecting the abnormal state of a machine tool so as to protect the machine tool from an impact caused by an abnormality in the operation and, more particularly, to an abnormal state detecting apparatus of a machine tool having a feedback circuit.

2. Description of the Related Art

Numerically controlled machine tools such as a numerically controlled lathe which are operated for a predetermined machining while being numerically controlled in accordance with NC program data are widely used.

Such a numerically controlled machine tool, however, has some problems. For example, when a work hits against the tool or another part due to an error in a machining program or an error in the operation, serious influence is exerted on the machining accuracy, or the work, the tool or the machine is sometimes damaged.

For example, such a problem was actually brought about when the tool or the tool rest hit against the spindle while it was being fed to the feed shaft mechanism.

To avoid such a problem, the feed shaft mechanism with a mechanical overload preventing device such as a shear pin or a torque limiter is conventionally provided so as to lighten the impact applied to the important portion such as the work and the machine by collision. Some feed shaft mechanisms are provided with an emergency stopping device for constantly monitoring the acceleration of the feed shaft mechanism so as to detect an abnormal acceleration due to a collision and stop the machine in case of emergency.

FIG. 5 is a schematic side elevational view of the structure of the feed shaft mechanism of a lathe as an example of such a numerically controlled machine tool.

In FIG. 5, the lathe is composed of a spindle 10, a work 12 held by the chuck of the spindle 10, a cutting tool 14 for cutting the work 12, a tool rest 16 for fixing the cutting tool 14, a saddle 18 (traverse table) for positioning the cutting tool 14 by feeding it in the transverse direction to the position for cutting the work 12, a servo-motor 20 as a driving source for moving the saddle 18 itself at predetermined speed and thrust (torque) and a ball screw 22 which is connected to the rotary shaft 20a of the servo-motor 20.

A coupling 24 is provided between the ball screw 22 and the rotary shaft 20a of the servomotor 20. The coupling 24 is a collision detecting device such as a mechanical overload preventing device or an emergency stopping device.

In a lathe having the above-described structure, when the cutting tool 14 or the tool rest 16 hits against the work 12 due to an error in operation, an error in programming or the like, the impact of collision is transmitted from the tool rest 16 to the servomotor 20 through the saddle 18, the ball screw 22 and the coupling 24.

Therefore, the impact between the coupling 24 and the servomotor 20 is detected by the collision detecting device provided therebetween so as to prevent the torque from being transmitted and to protect the work 12 and the cutting tool 14 from the impact.

FIG. 6 shows the coupling 24 which is the mechanical overload preventing device provided as a collision detecting device in FIG. 5. The principle of the operation thereof will be explained hereinunder.

In FIG. 6, the mechanical overload preventing device is composed of a shear pin 26. When a collision is caused, namely, the cutting tool 14, the tool rest 16, the saddle 18 or the like at the end of the feed shaft system hits against the work 12 and an overload is applied to the ball screw 22 through the saddle 18, the ball screw 22 is suddenly stopped.

However, since the rotary shaft 20a of the servomotor 20 tends to continue the rotation in opposition to the stopping operation of the ball screw 22, the shear pin 26 itself is sheared by the thrust of the rotary shaft 20a, whereby the torque is not transmitted between the servomotor 20 and the ball screw 22.

In this way, the mechanical overload preventing device suppresses the damage of the feed shaft system and the influence of a collision on the mechanical accuracy to the minimum by preventing the torque from being transmitted from the servomotor 20 to the ball screw 22.

The operation of a conventional emergency stopping device which detects a collision from the acceleration will now be explained with reference to FIGS. 7 and 8.

FIG. 7 shows the time constant in the states of accelerating and decelerating the feed shaft system of a machine tool during the normal operation, and FIG. 8 shows the time constant during the collision of the feed shaft system.

This type of emergency stopping device for detecting a collision from a change in the speed is so controlled that the time constant at the time of acceleration and deceleration of the feed shaft mechanism during the normal operation is constant.

As shown in FIG. 8, the speeds Vs1 and Vs2 at a suspension during the normal operation are lowered at a predetermined rate and the change in the speed is constant.

However, when the tool 14 or the tool rest 16 hits against the work 12 or another part, the speed or a change in the speed (acceleration) is different from that in the normal state, as shown in FIG. 8. In other words, the deceleration rate shows an abnormality.

In FIG. 8, the speeds Vc1, Vc2 at the time of a collision are distinctly different from the speeds Vs1, Vs2 in the normal state. That is, the change in the speed is not constant at the time of a collision.

Therefore, in a conventional emergency stopping device for stopping the machine when a collision is detected, the breakage due to a collision of a machine system is suppressed to the minimum by stopping the feed shaft system merely on the basis of the detected change in the speed (acceleration) at the time of a collision.

However, a collision detecting device having such a conventional mechanical overload preventing device in a numerically controlled machine tool has the following designing and manufacturing problems.

(1) The load for shearing the shear pin 26 is unstable due to the nonuniformity of the quality of the shear pin 26, namely, the nonuniformity of the machining accuracy of the shear pin 26.

(2) Since a load is constantly applied to the shear pin 26 when the feed shaft is moved, the shear pin 26 is sometimes sheared even during the normal operation due to a change with time and fatigue after a long-term use, thereby actuating the mechanical overload preventing device itself.

(3) Since the shear pin 26 is sheared by a mechanical system, it is difficult to set the accurate value of the load which actuates the mechanical overload preventing device.

(4) It is necessary to install the collision detecting device in the interior of a machine tool due to the structure of the machine tool itself. It is therefore necessary to take out the device for replacing the shear pin 26 which is sheared by the operation of the device at the time of a collision and restore it to the original place after replacement. This operation takes much time and labor.

(5) The mechanical system of the device increases the number of necessary parts and assembly steps and, hence, raises the manufacturing cost.

(6) The step for aligning the ball screw 22 and the rotary shaft 20a coaxially with each other when disposing the coupling 24 must be performed anew.

On the other hand, in a conventional emergency stopping device for detecting a collision only from the acceleration, especially, in the case of cutting, the speed (acceleration) of the feed shaft mechanism is comparatively constant with a small change in a light cutting or a continuous cutting of a round material in which the amount of cutting and the amount of feeding are small.

However, in a heavy cutting or an intermittent cutting of a square material in which the cutting conditions rapidly change, since the speed of the feed shaft also rapidly changes (a change in the speed is not constant), discrimination between the normal cutting and an abnormal cutting (collision) is very difficult.

Therefore, the accurate detection of a collision is impossible in such a conventional emergency stopping device for detecting a collision only from the acceleration.

That is, the emergency stopping device is lacking in reliability.

SUMMARY OF THE INVENTION

Accordingly, it is an object of the present invention to eliminate the above-described problems in the prior art and to provide a collision detecting apparatus of a numerically controlled machine tool which is capable of accurate detection and control of a collision between a work and the tool with a simple structure at a low cost in place of a mechanical overload preventing device, thereby suppressing the damages of the tool and the work caused by a collision to the minimum.

To achieve this aim, an abnormal state detecting apparatus according to the present invention comprises a circuit which is provided with a means for indicating the acceleration and the torque of the servomotor and for comparing the indicated acceleration and torque with the reference data in the abnormal state and for detecting abnormal acceleration and torque of the servomotor and further detecting an abnormal operation state of the servomotor from the indicated acceleration speed and torque, and which controls a torque command signal transmitted to the servomotor while judging that there is an abnormality in the operation state of the machine tool when the torque, acceleration speed and operating state of the servomotor are all abnormal, thereby protecting the machine tool from an impact in the abnormal operation state.

To state this more concretely, an abnormal state detecting apparatus according to the present invention comprises: a feedback circuit including at least a rotational position detector for detecting the rotational position of a servomotor, a position signal/speed signal converter for receiving the rotation signal output from the rotational position detector and converting the received signal to a speed signal, a speed command processor for generating a speed command signal by comparing a rotational position command signal output from a position command processor with the rotational position signal and a torque common and processor for generating a torque command signal by comparing the speed command signal with the speed signal; a speed signal/acceleration signal converter connected for receiving the speed signal from the position detector to produce an acceleration signal representing the acceleration of the servomotor; a data setting circuit, or position for outputting a reference torque signal and a reference acceleration signal; an acceleration comparator for comparing the acceleration signal with the reference acceleration signal and outputting an abnormal acceleration detection signal when the rate of speed change of the servomotor exceeds a preset reference value which corresponds to the reference acceleration signal; a torque comparator for comparing the torque command signal with the reference torque signal and outputting an abnormal torque detection signal when the torque of the servomotor exceeds a preset reference value which corresponds to the reference torque signal; an operation state judging circuit for detecting the acceleration or deceleration of the servomotor from the acceleration signal and the increase or decrease of the torque of the servomotor from the torque command signal and outputting an abnormal operation state detection signal when the acceleration and the decrease of the torque of the servomotor are simultaneously generated or when the deceleration and the increase of the torque of the servomotor are simultaneously generated; and an abnormal state detecting circuit for outputting an abnormal state detection signal when the abnormal acceleration detection signal, the abnormal torque detection signal and the abnormal operation state detection signal are simultaneously input; whereby an abnormal operation state of the machine tool is detected. The abnormal state detecting apparatus further comprises a circuit for controlling the torque command signal when the abnormal state detection signal is input from the abnormal state detecting circuit, whereby the machine tool is protected immediately after an abnormal state is detected.

Since it is also possible to obtain a speed signal and an acceleration signal by using a speed detector and an acceleration detector for detecting the rotational speed and the rotational acceleration directly from the servomotor, the rotational position detector, a speed detector and an acceleration detector, as well as the position signal/speed signal converter and the speed signal/acceleration signal converter are incorporated into the circuit, as occasion demands.

According to the present invention having the above-described structure, an abnormal acceleration and an abnormal torque of the servomotor are detected and an abnormal operation state of the servomotor is further detected from the detected acceleration and torque. When these torque, acceleration speed and operating state of the servomotor are all abnormal, it is judged that there is an abnormality in the operation state of the machine tool, and a torque command signal which is to be supplied to the servomotor is controlled, thereby protecting the machine tool from an impact in the abnormal operation state.

In other words, if an abnormal acceleration detection signal output when the rate of speed change of the servomotor exceeds the preset reference value, an abnormal torque detection signal output when the torque of the servomotor exceeds the preset reference value and an abnormal operation state detection signal output when the acceleration and decrease of the torque of the servomotor are simultaneously generated or when the deceleration and increase of the torque of the servomotor are simultaneously generated concurrently with the abnormal acceleration and torque detection signals, an abnormal state detection signal which indicates an abnormal operation state of the machine tool is output. Further, by incorporating the circuit for controlling the torque command signal when the abnormal state detection signal output from the abnormal state detecting circuit is input, the machine tool is protected immediately after an abnormal state is detected.

If a collision is selected as an abnormal state of the machine tool, it is possible to detect a collision by selecting the torque value and the acceleration value in a collided state as the reference values for the torque value and the acceleration value which can be selected in the data setting circuit for outputting the reference torque signal and the reference acceleration signal.

The above and other objects, features and advantages of the present invention will become clear from the following description of a preferred embodiment thereof, taken in conjunction with the accompanying drawings.

DESCRIPTION OF THE PREFERRED EMBODIMENT

An embodiment of the present invention will be explained hereinunder with reference to the accompanying drawings.

Figure 1:
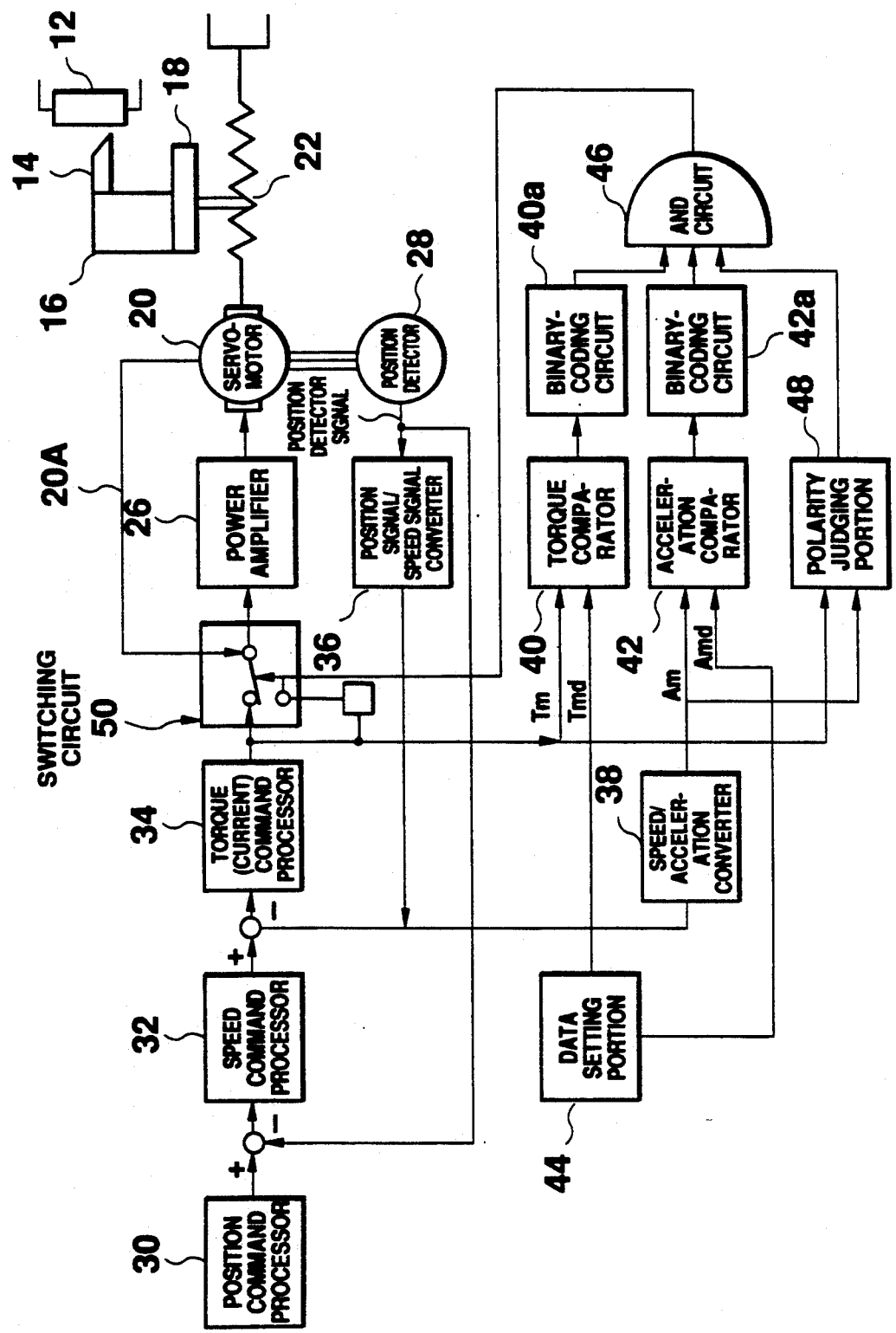
FIG. 1 is a circuit diagram of a collision detecting apparatus according to the present invention.

FIG. 1 is a circuit diagram of an embodiment of a collision detecting apparatus according to the present invention.

Figure 5:
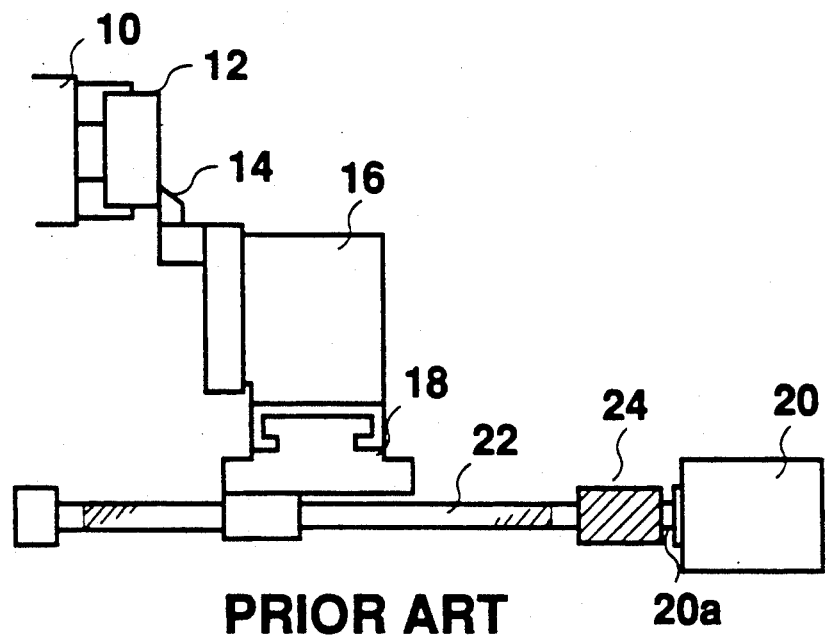
FIG. 5 shows the structure of the feed shaft mechanism as an example of a conventional collision detecting device of a machine tool.
Figure 6:
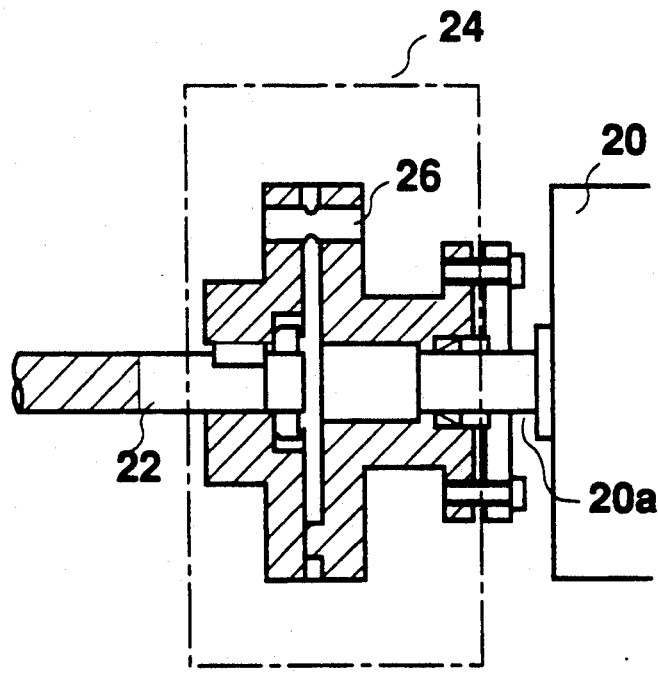
FIG. 6 schematically shows the structure of a conventional mechanical overload preventing device.
Figure 7:
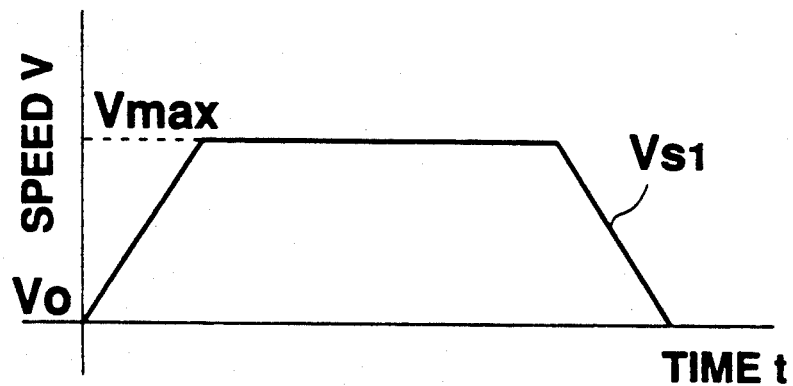
FIGS. 7 and 8 are characteristic diagrams of a change in the speed of a conventional feed shaft mechanism.
Figure 8:
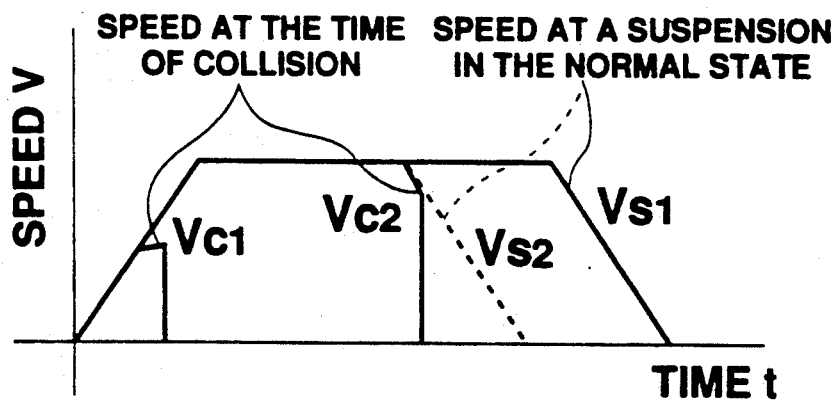

The same numerals are provided for the elements which are the same as those shown in FIGS. 5 and 6, and explanation of the structure and operation thereof will be omitted.

The present invention is characterized in that when the detected acceleration and load thrust of the feed shaft mechanism exceed the preset permissible acceleration and permissible thrust and when the direction of acceleration of the feed shaft mechanism does not agree with the direction of thrust, the machine tool is judged to be in the collided state and the thrust of the feed shaft mechanism is adjusted.

Generally, in a servo system using the servomotor 20 for this kind of feed shaft mechanism, when an overload is applied to the feed shaft mechanism (rotary shaft), in other words, when a collision is caused, a torque command for ordering the servomotor 20 to output a larger torque is output.

On the other hand, since the maximum torque possible Tmax of the servo system is determined by the servomotor 20 itself and the driving system (the maximum torque possible Tmax of the servomotor 20), if the load (thrust) of the feed shaft mechanism exceeds the maximum torque Tmax during the rotation of the servomotor 20, the servomotor 20 cannot maintain the speed assigned by the command, so that the speed is lowered.

Thus, it is possible to detect the load thrust of the feed shaft mechanism which exceeds a predetermined permissible thrust, e.g., the permissible torque value of the servomotor 20 and it is possible to detect the lowering of the speed of the servomotor 20 by a speed/acceleration detection signal.

With respect to the direction of the output of the thrust of the feed shaft and the direction of the acceleration of the feed shaft, they agree with each other when no or a light load is applied to the feed shaft mechanism, but they disagree when the servomotor 20 cannot maintain the assigned speed due to overloading (generation of a collision). That is, in the latter case, a load other than the load based on the command obstructs acceleration or deceleration.

Accordingly, in the present invention, when the detected acceleration and load thrust of the feed shaft mechanism exceed the preset reference values and when the direction of acceleration of the feed shaft mechanism does not agree with the direction of thrust, the machine tool is judged to be in the collided state and the thrust of the feed shaft mechanism is adjusted.

An example of the structure and the operation of the collision detecting mechanism shown in FIG. 1 will now be explained with reference to FIGS. 3 and 4.

Figure 3:
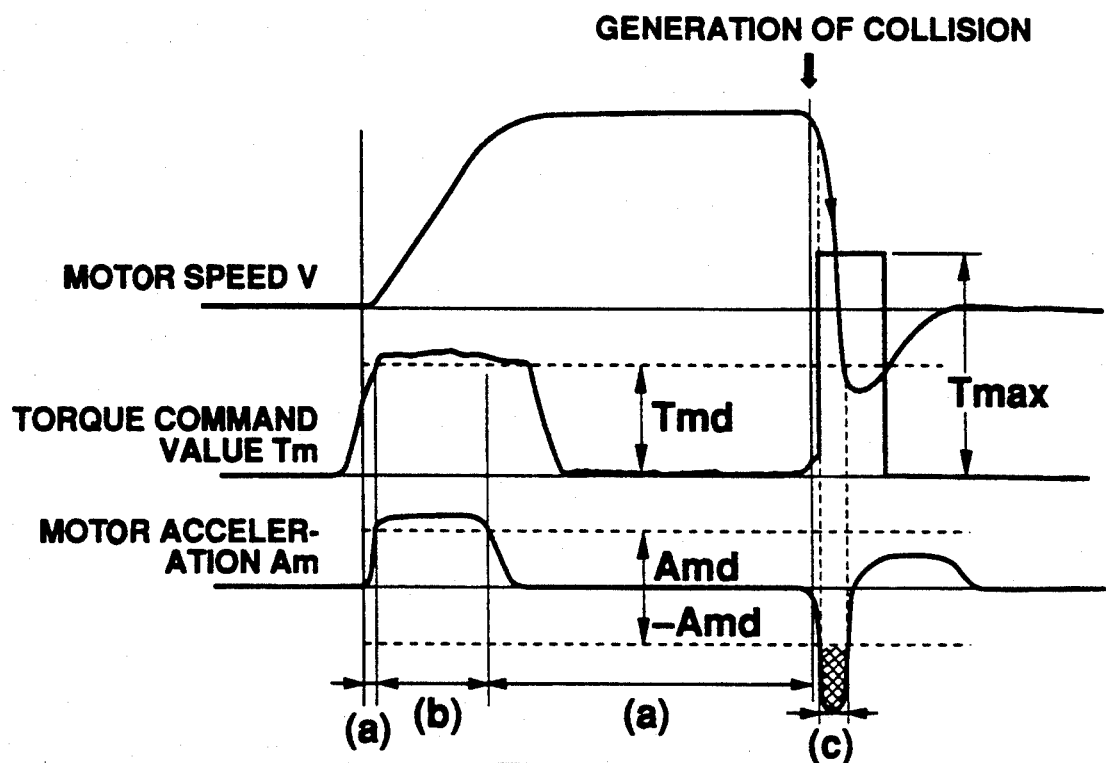
FIGS. 3 an 4 are explanatory views of changes in the motor speed, torque command and motor acceleration at the time of a collision.
Figure 4:
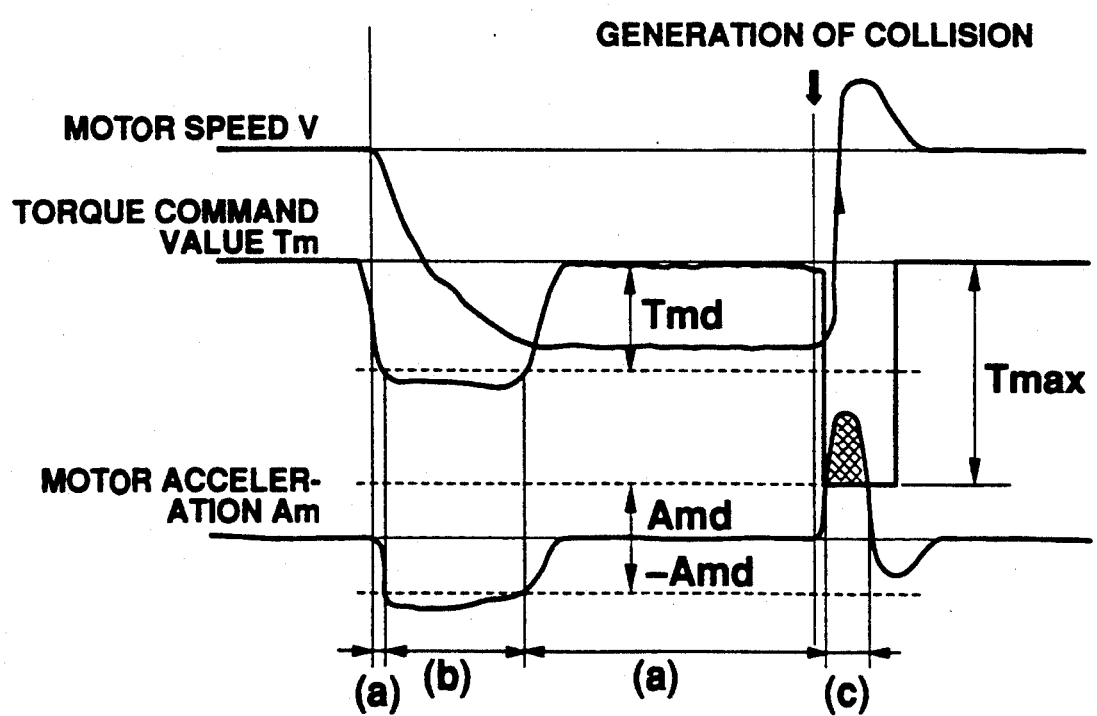

FIGS. 3 and 4 show the characteristics of changes of the motor speed, torque command and motor acceleration caused by a collision while the saddle 18 is being moved in the direction of +and −, respectively.

In this embodiment, the acceleration of the movement and the load thrust of the feed shaft mechanism are detected, and a collision of the numerically controlled machine tool is detected on the basis of the fact that the detected acceleration and thrust are more than the respective permissible values and the fact that the direction of the acceleration disagrees with the direction of the thrust.

In FIG. 1, the collision detecting apparatus of this embodiment comprises a servomotor including the driving system for the feed shaft mechanism, which is a servo system of a general feed shaft mechanism, and provided with a power amplifier 26 and a position detector 28, a position command processor 30, a speed command processor 32, a position signal/speed signal converter 36 and a speed/acceleration converter 38 as an acceleration detecting means.

The collision detecting apparatus also comprises a torque command generating means, which is characteristic of this embodiment. The torque command generating means is composed of a torque command processor 34, a torque comparator 40 and an acceleration comparator 42 as a collision judging means including binary-coding circuits 40a, 42a, respectively, a data setting portion 44, an AND circuit 46 and a polarity judging portion 48.

In the driving system of the feed shaft mechanism, the actual speed of the servomotor 20 is detected by the position signal/speed signal converter 36 on the basis of the position detection signal output from the position detector 28 which is attached to the servomotor 20, and on the basis of the actual speed value (actual speed signal), the acceleration of the servomotor 20 is calculated as the acceleration of the feed shaft mechanism by the speed/acceleration converter 38.

As to the thrust of the feed shaft mechanism, the torque command value generated by the servo system of the present invention is calculated by the torque command processor 34 and on the basis of the calculated torque command value, the servomotor 20 is driven at a predetermined thrust.

The torque command value is input to the power amplifier 26 which is connected to the servomotor 20 through a switching circuit 50.

The switching circuit 50 provided between the torque command processor 34 and the power amplifier 26 performs a changeover between the contacts A (connection) and B (breaking) with the torque command processor 34, as shown in FIG. 1. Ordinarily, the torque command processor 34 is connected to the A side, and the position and the speed of the saddle 18 are controlled through the ball screw 22 by the driving of the servomotor 20.

The position command processor 30 calculates the position command value for moving, e.g., the tool 14, namely, the saddle 18 to a predetermined position by driving the servomotor 20 and outputs a position command signal.

The speed command processor 32 receives the position command signal and a position detection signal supplied from the position detector 28, and calculates a speed command signal for moving the saddle 18 as the feed shaft mechanism, The speed command signal represents a predetermined speed at which saddle 18 is to be moved.

The torque command processor 34 inputs the speed command signal and the actual speed signal which indicates the actual speed of the servomotor 20 and which is output from the position signal/speed signal converter 36, and calculates a torque command value (the thrust of the feed shaft mechanism) for driving the servomotor 20 so as to move the saddle 18 to a predetermined position at an appropriate speed on the basis of these input signals.

Consequently, the servomotor 20 is driven at an optimum torque value in correspondence with the machining within the maximum torque value of the servomotor 20, and the feed shaft mechanism is moved at optimum thrust and speed which enable the work to be machined.

If the saddle 18 hits against another saddle portion, the spindle of the machine tool or the work 12 during machining, an overload is applied to the servomotor 20, so that the torque command value Tm immediately reaches the maximum torque value Tmax. When the thrust due to the overload exceeds Tmax, the motor speed V is suddenly lowered, whereby the motor acceleration value Am is generated in the opposite direction to the direction of the torque command value Tm, as shown in FIGS. 3 and 4.

In this embodiment, it is first detected from the torque command value that the load thrust of the feed shaft mechanism is not less than the permissible torque value Tmd of the servomotor 20 and then the lowering of the speed of the servomotor 20 is detected from the acceleration detection signal. If the direction of the motor acceleration Am and the direction of the torque command value Tm are opposite to each other, it is judged that a collision has been generated.

The collision detecting operation will now be explained in more detail hereinunder. As shown in FIG. 1, the torque command value Tm and the motor acceleration Am are compared with the preset permissible torque value Tmd and permissible acceleration Amd, respectively, which are the reference values of the data setting portion 44.

These comparing operations are carried out by the torque comparator 40 and the acceleration comparator 42, respectively, and the results are converted into digital signals by the binary-coding circuits 40a and 42a, respectively, and input to the AND circuit 46.

The polarities of the torque command value Tm and the motor acceleration Am are judged by the polarity judging portion 48 so as to judge the directions of thrust and acceleration. If all the conditions that torque command |Tm| > Tmd, that the motor acceleration |Am| > Amd and that the polarities of Tm and Am disagree with each other are satisfied, it is judged that a collision has been generated. As a result, a collision judgment signal is output from the AND circuit 46.

The AND circuit 46 generates a current zero command signal as the collision judgment signal by the AND calculation based on the respective input signals, the switching circuit 50 switches over the contact A (connection) to the contact B (breaking).

As a result, the current which is being supplied to the servomotor 20 is cut off and the thrust of the servomotor 20 is set free of torque when a collision is detected.

Figure 2:
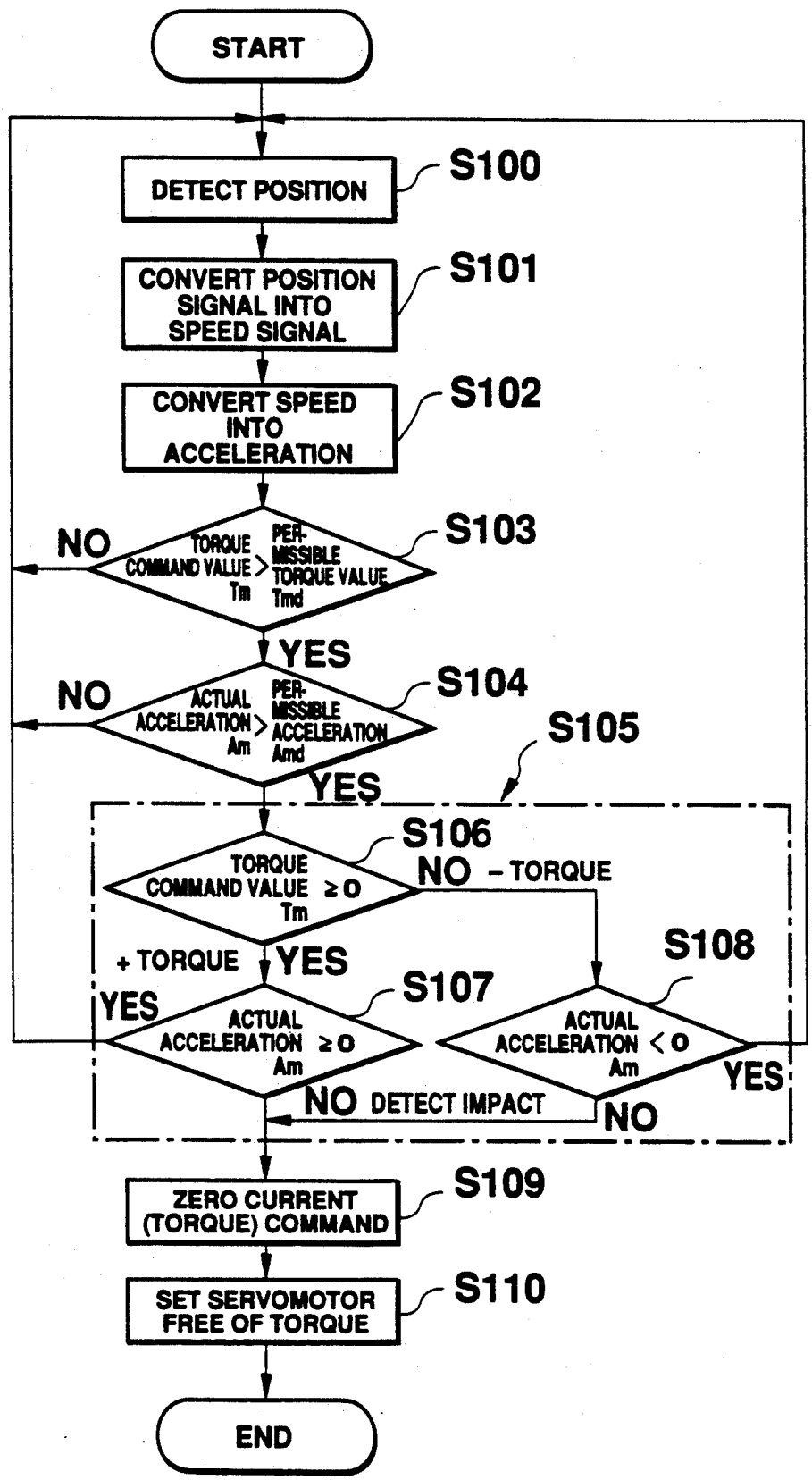
FIG. 2 is a flowchart of an example of the operated state of the circuit shown in FIG. 1.

A series of actual collision detecting operations in accordance with the present invention will be explained along the flow chart in FIG. 2 and with reference to FIGS. 3 and 4.

In the collision detecting apparatus shown in FIG. 1, the position of the saddle 18 is detected by the position detector 28 (step 100).

The amount of positional change per unit time, namely, the motor speed V is then obtained by the position signal/speed signal converter 36 (step 101).

The speed/acceleration converter 38 calculates the motor acceleration Am from the motor speed V (step 102).

The torque comparator 40 then compares the torque command value Tm, which is the output of the torque (current) command processor 34, with the permissible torque value Tmd of the data setting portion 44 which has predetermined reference values, and if the result of the judgment as to whether or not Tm > Tmd is NO, namely, if Tm ≦ Tmd (the measured value is not more than the permissible value), the judgment is that there is no collision the process returns to the step 100 (step 103).

On the other hand, if the result of the judgment as to whether or not Tm > Tmd is YES, namely the measured value is more than the permissible value, the acceleration comparator 42 compares the actual motor acceleration Am calculated by the speed/acceleration converter 38 at the step 102 with the permissible acceleration Amd preset by the data setting portion 44.

If the result of the judgment as to whether or not Am > Amd is NO, namely, Am ≦ Amd (the measured value is not more than the permissible value), the judgment is that there is no collision, the process returns to the step 100 (step 104).

On the other hand, if the result of the judgment as to whether or not Am >Amd is YES, namely the measured value is more than the permissible value, the polarity judging portion 48 compares the polarities of the torque value Tm and the actual acceleration Am (step 105).

At the step 105, only when both the torque command value Tm and the actual acceleration Am exceed the permissible torque value Tmd and the permissible acceleration Amd, respectively, namely, in the regions (b) and (c) in FIGS. 3 and 4, the polarities are judged.

In the regions (a), since both the torque command value Tm and the actual acceleration Am are less than the permissible reference values Tmd and Amd, respectively, no polarity judgment is executed at the step 105.

At the polarity judgment at the step 105, if both polarities of the torque command value Tm and the actual acceleration Am are positive (+), namely, Tm $\geq 0$ (step 106) and Am $\geq 0$ (step 107), the machining state is judged to be normal and the process returns to the step 100 so as to continue machining.

If the answer for the judgment as to whether or not Tm $\geq 0$ at the step 106 is NO and the answer for the judgment as to whether or not Am <0 at the step 108 is YES, in other words, if both polarities of the torque command value Tm and the actual acceleration Am are negative (−), the machining state is also judged to be normal and the process returns to the step 100 so as to continue machining.

These operation states are equivalent to the regions (b) in FIGS. 3 and 4.

On the other hand, if the polarity of the torque command value Tm is different from that of the actual acceleration Am, namely, when the answer for the judgment as to whether or not Am $\geq 0$ at the step 107 is NO and the answer for the judgment as to whether or not Am <0 at the step 108 is NO, the AND circuit 46 judges that a collision has been caused in accordance with the conditions at the steps 103 and 104.

This collided state is equivalent to the regions (c) in FIGS. 3 and 4, and the hatched portions indicate the time region in which the collision is recognized.

In this time region, after the collision is recognized, the zero current command is output from the AND circuit 46 (step 109), and in accordance with the zero current command generated, the switching circuit 50 switches over the contact A to the contact B and cuts off (zero current) the current supply to the servomotor 20 through the power amplifier 26 so as to set the motor 20 free of torque (step 110).

In this way, a sequence of detection of a collision and control of the motor torque is carried out, thereby enabling the damage of the tool 14, the work 12 and other machine parts to be suppressed to the minimum.

In this embodiment, a method of detecting a collision between the saddle 18 of a numerically controlled machine tool and the spindle 10 or the work 12 and setting the servomotor 20 free of torque is shown as an example, but an intermittent cutting which does not yet cause a collision but exceeds the tolerance of the machine can also be detected by changing the permissible torque value Tmd and the permissible acceleration Amd.

Although the servomotor 20 is set free of torque by the torque (zero current) command after the detection of a collision in this embodiment, it is also possible to reduce the damage of the machine by generating the torque in the reverse direction to the direction of the output torque at the time of a collision.

In addition, although a torque value which exceeds the permissible torque value is detected by using the torque command signal output from the torque command processor 34 on the assumption that the thrust of the feed shaft mechanism is predetermined in this embodiment, alternatively, a similar effect is obtained by providing a thrust detecting means for detecting the thrust of the feed shaft mechanism and outputting a thrust detection signal, for example, on the rotary shaft of the servomotor 20.

It is also possible to use as the speed and acceleration detecting means, for example, a rotational acceleration detector for outputting an acceleration detection signal on the basis of the rotational acceleration of the servomotor 20 in place of the position detector 28, the position signal/speed signal converter 36 and the speed/acceleration converter 38.

As described above, according to the collision detecting apparatus of a numerically controlled machine tool of the present invention, it is possible to detect the generation of a collision by judging as to whether or not the acceleration detection signal and the thrust detection signal exceed the preset permissible values and as to whether or not the direction of acceleration disagrees with the direction of thrust, thereby reducing the damage of the machine by the adjustment of the thrust of the feed shaft mechanism by, for example, cutting off the torque command at the time of a collision.

In the present invention, an electrical protecting apparatus is adopted as the collision detecting apparatus without providing a conventional mechanical overload preventing device on the feed shaft mechanism. Since the collision detecting apparatus of the present invention dispenses with a machine part which suffers from a change with a lapse of time, it is cheap, stable for a long term and highly accurate.

Furthermore, since the number of machine parts is small, the collision detecting apparatus of the present invention is also advantageous in the manufacturing cost.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An abnormal state detecting apparatus for protecting a machine tool which is driven by a servomotor from an impact in an abnormal operation state, said apparatus comprising:
   (a) circuit means for outputting a torque signal corresponding to the load applied to a servomotor, said circuit means including at least a rotational position detector for detecting the rotational position of the servomotor, a position signal/speed signal converter for receiving a rotational position signal output from said rotational position detector and converting said position signal to a speed signal, a speed command processor for generating a speed command signal by comparing a rotational position command signal output from a position command processor with said rotational position signal and a torque command processor for generating a torque command signal by comparing said speed command signal with said speed signal, said torque command signal being amplified so as to drive the servomotor;

(b) a data setting circuit having selected reference data on a torque value and an acceleration value which can be selected and outputting a reference torque signal and a reference acceleration signal which correspond to the selected reference data on said torque value and acceleration value, respectively;

(c) a speed/acceleration converter for converting said speed signal output from said position signal/speed signal converter into an acceleration signal;

(d) an acceleration comparator for comparing said acceleration signal output from said speed/acceleration converter with said reference acceleration signal output from said data setting circuit and outputting an abnormal acceleration detection signal when the rat of speed change of the servomotor exceeds the acceleration value which corresponds to said reference acceleration signal;

(e) a torque comparator for comparing said torque command signal output from said torque command processor with said reference torque signal output from said data setting circuit and outputting an abnormal torque detection signal when the torque of the servomotor exceeds the torque value which corresponds to said reference torque signal;

(f) an operation state judging circuit for detecting the acceleration or deceleration of the servomotor from said acceleration signal and the increase or decrease of the torque of the servomotor from said torque command signal and outputting an abnormal operation state detection signal when an acceleration and a decrease of the torque of the servomotor are simultaneously generated or when a deceleration and an increase of the torque of the servomotor are simultaneously generated; and (g) an abnormal state detecting circuit for outputting an abnormal state detection signal when said abnormal acceleration detection signal output from said acceleration comparator, said abnormal torque detection signal output from said torque comparator and said abnormal operation state detection signal output from said operation state judging circuit are simultaneously input.

2. An abnormal state detecting apparatus according to claim 1, further comprising a control circuit for controlling the driving of the servomotor when said abnormal state detection signal is input to said control circuit from said abnormal state detecting circuit.

3. An abnormal state detecting apparatus according to claim 1, further comprising a switching circuit for turning OFF said torque command signal when said abnormal state detection signal is input to said control circuit from said abnormal state detecting circuit.

4. An abnormal state detecting apparatus according to claim 1, further comprising a braking circuit for applying a torque in the reverse direction to said servomotor when said abnormal state detection signal is input to said braking circuit from said abnormal state detecting circuit.

5. An abnormal state detecting apparatus for protecting a machine tool which is driven by a servomotor from an impact in an abnormal operation state, said apparatus comprising:

(a) circuit means for outputting a torque signal corresponding to the load applied to a servomotor, said circuit means including at least a rotational position detector for detecting the rotational position of the servomotor and outputting a rotational position signal, a speed detector for detecting the rotational speed of the servomotor and outputting a speed signal, a speed command processor for generating a speed command signal by comparing a rotational position command signal output from a position command processor with said rotational position signal and a torque command processor for generating a torque command signal by comparing said speed command signal with said speed signal, said torque command signal being amplified so as to drive the servomotor;

(b) a data setting circuit having selected reference data on a torque value and an acceleration value which can be selected and outputting a reference torque signal and a reference acceleration signal which correspond to the selected reference data on said torque value and acceleration value, respectively;

(c) a speed/acceleration converter for converting said speed signal output from said position signal/speed signal converter into an acceleration signal;

(d) an acceleration comparator for comparing said acceleration signal output from said speed/acceleration converter with said reference acceleration signal output from said data setting circuit and outputting an abnormal acceleration detection signal when the rate of speed change of the servomotor exceeds the acceleration value which corresponds to said reference acceleration signal;

(e) a torque comparator for comparing said torque command signal output from said torque command processor with said reference torque signal output from said data setting circuit and outputting an abnormal torque detection signal when the torque of the servomotor exceeds the torque value which corresponds to said reference torque signal;

(f) an operation state judging circuit for detecting the acceleration or deceleration of the servomotor from said acceleration signal and the increase or decrease of the torque of the servomotor from said torque command signal and outputting an abnormal operation state detection signal when an acceleration and a decrease of the torque of the servomotor are simultaneously generated or when a deceleration and an increase of he torque of the servomotor are simultaneously generated; and (g) an abnormal state detecting circuit for outputting an abnormal state detection signal when said abnormal acceleration detection signal output from said acceleration comparator, said abnormal torque detection signal output from said torque comparator and said abnormal operation state detection signal output from said operation state judging circuit are simultaneously input.

6. An abnormal state detecting apparatus according to claim 5, further comprising a control circuit for controlling the driving of the servomotor when said abnormal state detection signal is input to said control circuit form said abnormal state detecting circuit.

7. An abnormal state detecting apparatus according to claim 5, further comprising a switching circuit for turning OFF said torque command signal when said abnormal state detection signal is input to said switching circuit from said abnormal state detecting circuit.

8. An abnormal state detecting apparatus according to claim 5, further comprising a braking circuit for applying a torque in the reverse direction to said servomotor when said abnormal state detection signal is input to said braking circuit from said abnormal state detecting circuit.

9. An abnormal state detecting apparatus for protecting a machine tool which is driven by a servomotor from an impact in an abnormal operation state by utilizing a feedback control system of a servo mechanism of a machine tool, said apparatus comprising:

(a) circuit means for outputting a torque signal corresponding to the load applied to a servomotor, said circuit means including at least a rotational position detector for detecting the rotational position of the servomotor and outputting a rotational position signal, a speed detector for detecting the rotational speed of the servomotor and outputting a speed signal, a speed command processor for generating a speed command signal by comparing a rotational position command signal output from a position command processor with said rotational position signal and a torque command processor for generating a torque command signal by comparing said speed command signal with said speed signal, said torque command signal being amplified so as to drive the servomotor;

(b) a data setting circuit having selected reference data on a torque value and an acceleration value which can be selected and outputting a reference torque signal and a reference acceleration signal which correspond to the selected reference data on said torque value and acceleration value, respectively;

(c) an acceleration detector for detecting the rotational acceleration of the servomotor and outputting an acceleration signal;

(d) an acceleration comparator for comparing said acceleration signal output from said acceleration detector with said reference acceleration signal output from said data setting circuit and outputting an abnormal acceleration detection signal when the rate of speed change of the servomotor exceeds the acceleration value which corresponds to said reference acceleration signal;

(e) a torque comparator for comparing said torque command signal output from said torque command processor with said reference torque signal output from said data setting circuit and outputting an abnormal torque detection signal when the torque of the servomotor exceeds the torque reference value which corresponds to said reference torque signal;

(f) an operation state judging circuit for detecting the acceleration or deceleration of the servomotor from said acceleration detection signal and the increase or decrease of the torque of the servomotor from said torque command signal and outputting an abnormal operation state detection signal when an acceleration and a decrease of the torque of the servomotor are simultaneously generated or when a deceleration and an increase of the torque of the servomotor are simultaneously generated; and (g) an abnormal state detecting circuit for outputting an abnormal state detecting signal when said abnormal acceleration detection signal output from said acceleration comparator, said abnormal torque detection signal output from said torque comparator and said abnormal operation state detection signal output from said operation state judging circuit are simultaneously input.

10. An abnormal state detecting apparatus according to claim 9, further comprising a control circuit for controlling the driving of the servomotor when said abnormal state detection signal is input to said control circuit form said abnormal state detecting circuit.

11. An abnormal state detecting apparatus according to claim 9, further comprising a switching circuit for turning OFF said torque command signal when said abnormal state detection signal is input to said switching circuit from said abnormal state detecting circuit.

12. An abnormal state detecting apparatus according to claim 9, further comprising a braking circuit for applying a torque in the reverse direction to said servomotor when said abnormal state detection signal is input to said braking circuit from said abnormal state detecting circuit.

* * * * *